United States Patent [19]
Riemann et al.

[11] Patent Number: 4,509,697
[45] Date of Patent: Apr. 9, 1985

[54] ROTARY DRUM SCREEN FOR WASTE MATERIAL AND ITS METHOD OF OPERATION

[75] Inventors: Hanns-Helmut Riemann, Bochum; Hans Sonnenschein, Hatzperbogen; Heinz Skaletz, Recklinghausen, all of Fed. Rep. of Germany

[73] Assignee: Mannesmann Veba Umwelttechnik GmbH, Herne, Fed. Rep. of Germany

[21] Appl. No.: 385,395

[22] PCT Filed: Jan. 27, 1982

[86] PCT No.: PCT/DE82/00016
§ 371 Date: May 20, 1982
§ 102(e) Date: May 20, 1982

[87] PCT Pub. No.: WO82/02502
PCT Pub. Date: Aug. 5, 1982

[30] Foreign Application Priority Data
Jan. 29, 1981 [DE] Fed. Rep. of Germany ....... 3102846

[51] Int. Cl.³ .............................................. B02C 17/06
[52] U.S. Cl. ....................................... 241/72; 241/74; 209/683; 209/297

[58] Field of Search ..................... 209/39, 68, 69, 70, 209/71, 72, 293, 294, 296, 297, 298; 241/76, 77, 78, 74, 182, 299, 183, 72

[56] References Cited
U.S. PATENT DOCUMENTS

| 2,265,642 | 12/1941 | Hamachek | 209/298 X |
| 3,074,657 | 1/1963 | Bridgewater | 241/299 X |
| 3,224,839 | 12/1965 | Pierson | 241/78 X |
| 4,043,901 | 8/1977 | Gauld | 209/294 X |
| 4,154,407 | 5/1979 | Famort | 241/74 X |

Primary Examiner—David A. Scherbel
Assistant Examiner—Glenn Foster
Attorney, Agent, or Firm—Oblon, Fisher, Spivak, McClelland & Maier

[57] ABSTRACT

A rotary drum screen which exhibits baffles with impact plates extending in the direction of the periphery and a diameter which makes it possible to break up the refuse beforehand through free fall. The upper edge of the impact plates can have a saw tooth contour and the cross section of the drum casing is a polygon, preferably an octagon. The rotary drum screen rotates at a rotational speed such that the centrifugal acceleration at the drum casing is preferably 50–70% of acceleration due to gravity.

8 Claims, 3 Drawing Figures

ROTARY DRUM SCREEN FOR WASTE MATERIAL AND ITS METHOD OF OPERATION

TECHNICAL FIELD

The present invention is directed to a rotary drum screen for waste material and its method of operation, particularly for performing a pre-crushing function.

BACKGROUND ART

In raw and combustible material recovery from waste material using a processing line in a rotary screen drum, it is a known procedure to sift the waste material and to feed most of the unsifted material from the rotary screen drum into a milling unit. The milled material is then recombined with the sifted material.

DISCLOSURE OF THE INVENTION

The objective of the invention is to produce a rotary drum screen which, as far as practicable, also performs a pre-crushing function which reduces the amount of unsifted material. One of the purposes of this is to reduce the load on the mill whose operation consumes large amounts of energy. Another purpose is to primarily reduce the glass content of the mill discharge, because it is relatively costly to remove small glass shards as small as splinters from the waste stream during further processing. This objective is solved by one or preferably more baffles distributed along the length of the rotary drum screen which prevent the waste material from passing too quickly through the rotary drum screen and cause the waste material to repeatedly fall from the upper to the lower part of the drum, as well as impact plates running circumferentially around the drum in the baffle zones. In addition the rotary drum screen has a diameter adequate to impart the breakable waste material components sufficient speed when they fall from the upper to the lower part of the drum as it rotates to break the same when they impact the walls of the drum and particularly when they hit the impact plates. Drum diameters of 2 m to 4 m are generally adequate in this regard; approximately 3 m has been shown to be suitable for domestic waste.

The waste material can be brought to the upper part of the rotary sieve as it turns by carrier plates which are axially attached. However, since waste residue builds up relatively easily on these plates, which impedes further refuse transport, it is preferable to rotate the rotary drum screen at a relatively rapid speed. It has been found the drum rotation speeds at which the centrifugal acceleration at the drum surface is 50%–70% of the acceleration due to gravity, particularly in combination with the subsequently discussed polygonal cross section of the drum, produce a very steep refuse profile in the rotary drum screen and thus the greatest possible fall heights for the refuse in the drum. With the drum diameter of 3 m mentioned above the rotary drum screen can be driven, for example, at 15 R.P.M.

The erect impact plates break up brittle material such as pottery and bottles, however they should also be able to tear up trash bags and sacks which are generally made of plastic film. Therefore, the upper edge has preferable a saw tooth contour. By increasing the height of this saw tooth contour in the direction of the drum axis so that the lower part extends ahead in the direction of rotation, the forward conveying action of the impact plates is kept small so that the flanks of the teeth do not accumulate refuse residue.

The profile of the waste material in the drum should be as steep as possible so that the particulate matter is kept primarily in the state of free fall. To this end, the cross section of the drum casing is, along with the drum r.p.m. described above, of particular importance. It should be in the form of a polygon, particularly an octogon.

The baffles in the rotary drum screen should leave an opening large enough for the refuse to pass through without being overly expensive to construct but which disrupts the flow of the waste material within the casing. They can also serve as transverse supports for the drum casing. For this purpose they are made up of four rectangular plates, according to a further refinement of the invention, whose one side is equal to the octagon side (S) to which it is attached, and whose other side is equal to the cathetus length (S/$\sqrt{2}$) of the right angled, equal-sided triangle over the adjacent octagon side. The four plates are attached to four non-adjacent sides of the octagon and create one large rectangular opening and four small triangular openings for the refuse to pass through. By connecting their touching tips, e.g. by welding, the drum casing is reinforced.

In order to achieve a good break up or impacting effect with as little disturbance to the profile of the refuse as possible, it has proven to be advantageous to make the distance separating the impact plates equal to twice the width of the side of the polygon (2S), i.e. to attach the impact plates to every other side of the polygon, and to extend the rows of impact plates approximately two spiral turns, i.e. to arrange approximately as many impact plates in front of each baffle as there are sides on the polygon. The length of the impact plates should be equal to half of the width of the side of the polygon (S/2), their height equal to one quarter of the side of the polygon (s/4).

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

BEST MODE FOR CARRYING OUT THE INVENTION

Figure 1:
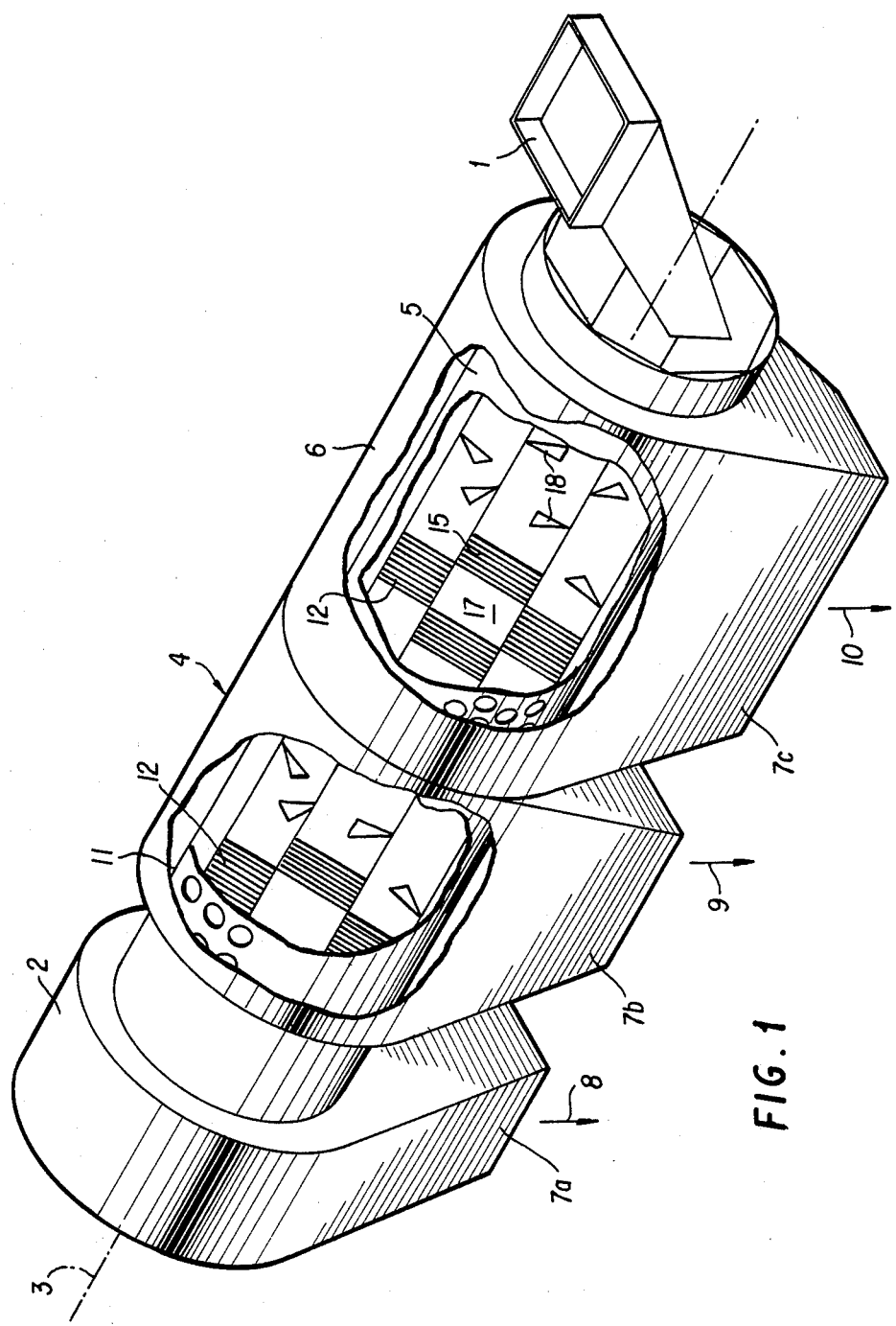
FIG. 1 illustrates a rotary drum screen for waste material with three discharge funnels, shown in three dimension and with a partial wall cut out.
Figure 2:
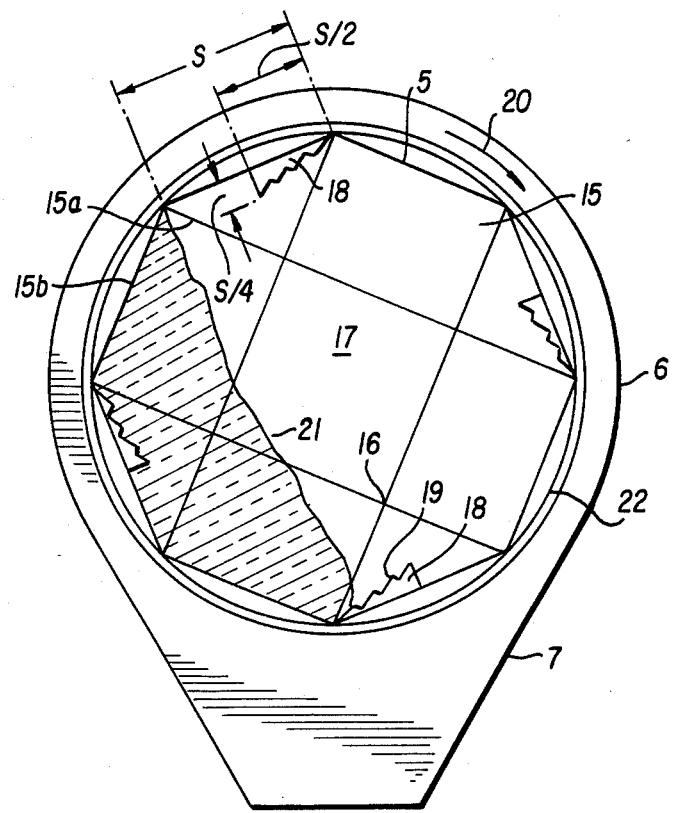
FIG. 2 shows the rotary drum screen according to FIG. 1 in cross section.
Figure 3:
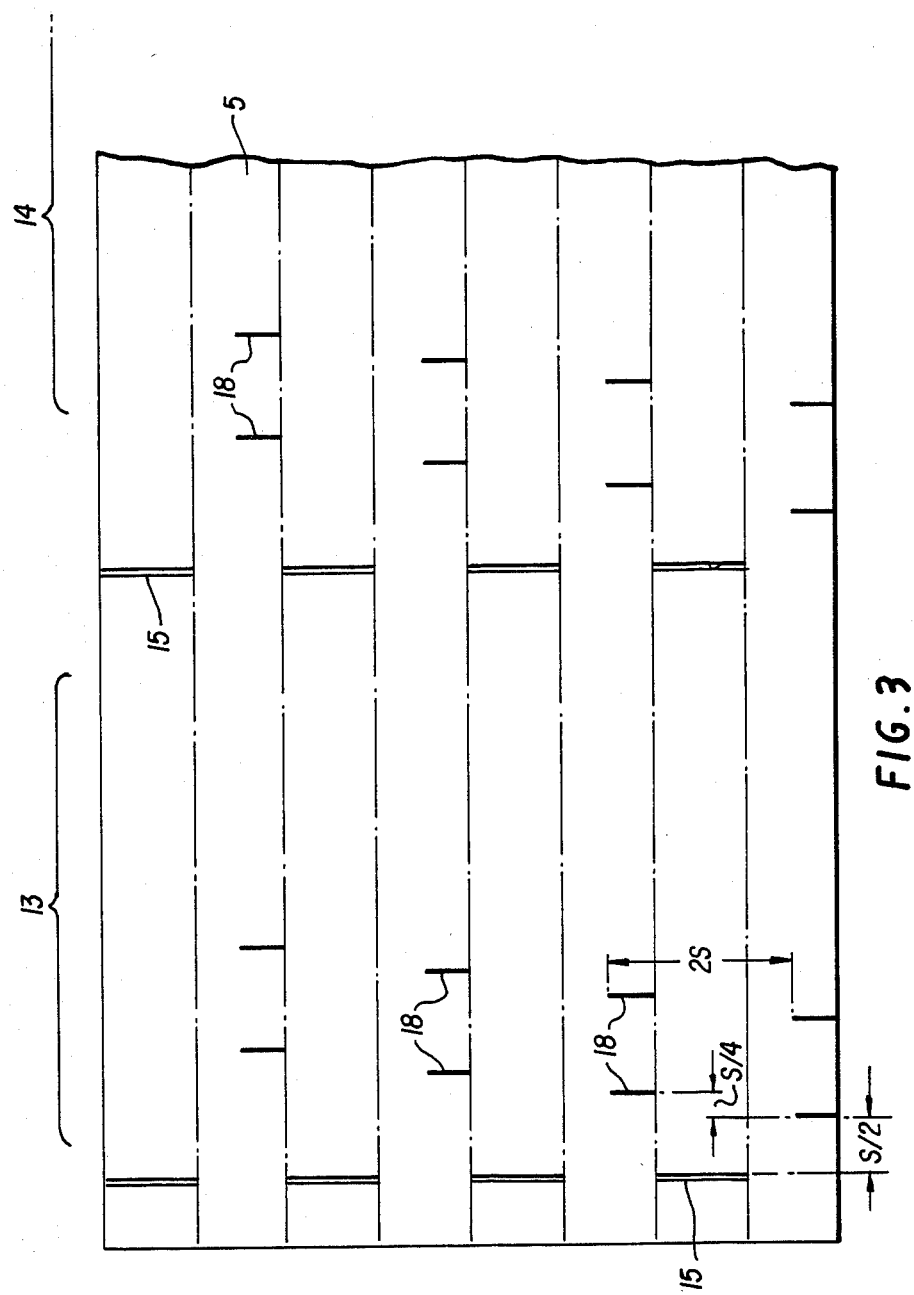
FIG. 3 shows a flattened section of the drum casing corresponding to the cross section according to FIG. 2.

A rotary drum screen 4 extending along a system axis 3 tilted from the point of waste material introduction member 1 toward the point of overflow discharge 2, has a rotating, octagonal drum casing 5, enclosed by a stationary, essentially cylindrical housing 6. The rotary drum screen 4 is driven and guided by the bearing race 22. The housing of the overflow discharge 2 opens to the bottom into a discharge funnel 7a. Two additional discharge funnels 7b and 7c, which are increasingly longer toward the front, produce as is shown with arrows, a coarse grade 8, a medium grade 9, and a fine grade 10. The screen holes 11 in the casing of the drum 5 are larger in the area of discharge funnel 7b than the holes in the area of discharge funnel 7c.

Correspondingly, the length of the drum is divided by two baffles 12 into two baffle sections 13 and 14. The baffles 12 are each made up of four rectangular plates 15, whose one side 15b is equal to the width of the octagonal side S and whose other side is equal to the cathetus length of the right angled, equal sided triangle over the adjacent octagon side S. The contact points 16 of the plates that are marked as welding points in the drawing reveal a square flow through opening 17 left open in the center and that the plates 15 diagonally reinforce the drum casing.

Beginning at the distance S/2 from the rectangular plates 15 two screw turns are defined in both baffle sections 13 and by interrupted rows of impact plates 18. The axial distance S/4 between the impact plates is equal to one quarter and the division distance 2S twice the width of an octagonal side s. The double spiral line formed in this manner is approximately half as long as the length of the baffle section. The upper edge of the impact plates 18 has a saw tooth contour 19. It increases in height in the direction of the drum axis 3. The radially outer portion of the contour extends in a rotational direction 20 of the casing 5.

A relatively steep refuse profile 21 results in the octagonal drum with a diameter of approximately 3 m when it turns at relatively high speed, e.g. 15 r.p.m. The octagonal shape of the drum itself improves the steepness of the refuse profile due to its improved ability to carry the refuse along as it turns in comparison to a cylindrical cross section. With rotation speeds of approximately 18 r.p.m. the free fall due to gravity associated with the steep refuse profile 21 achieves its greatest height differential and effect. Below approximately 12 r.p.m. the refuse profile is so flat on the one hand and the fall height differential so small on the other hand that solid objects such as bottles roll down the refuse slope with very little energy and are not broken up.

The drum diameter at approximately three meters is relatively large for a drum screen. A trash bag, for example, falls freely from a relatively high position, so that when it strikes the momentary bottom surface of the drum it will burst open and/or be torn open by the saw tooth edges of the impact plates 18, perhaps not always the first time, but surely after falling repeatedly. The same thing applies for glass bottles or easily breakable pottery.

In this regard it is essential that the impact plates 18 carry as little of the waste material as possible along with them as they turn. Thus, they are low and the saw tooth contour 19 climbs toward the drum axis. The impact plates should be able to free themselves of adhering small material easily in the 12 o'clock position, so that the objects dropping on them will hit a hard metal surface. The relatively large distance between the impact plates also minimizes the transfer effect along the casing. On the other hand, the distance should not be too great in order that the probability of an object striking an impact plate remain as high as possible.

The described arrangement of impact plates 18 only in the viscinity of the baffles 12 assures that a large amount of the slowly progressing refuse stream will already fall through the screen holes 11 before reaching the impact plate zone. In this zone just in front of the baffle the greatest back up of waste material occurs, whereas the area directly behind the baffle could be better described as a loosening or separating zone. Thus, for example, bottle necks and bottoms, if they have made it from the baffle zone 14 through the square opening 17 and through the four triangular openings on the periphery into baffle zone 13, will fall right through the larger screen holes in baffle zone 13.

The discharge portion 8 should consist essentially only of pieces of material such as paper, boxes, cans and plastic objects, which due to the limited free fall conditions here cannot be broken up.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rotary drum screen assembly for waste material, comprising:
   a housing;
   a drum screen casing mounted in said housing for rotation during operation of said drum screen assembly to cause waste material to flow through the drum screen casing;
   a first and second baffle positioned in said casing, for disrupting flow of said waste material within said casing and defining and dividing a first and second baffle zone; and
   a plurality of impact plates for impacting said waste material positioned in said casing and within said baffle zones, said plates being positioned on the periphery of the casing, wherein the diameter of said casing is such as to allow for breaking up of said waste material upon impact under the force of gravity with a wall of said casing during rotation of the rotary screen casing.

2. A rotary drum screen according to claim 1, wherein the an edge of the impact plates have a saw tooth contour.

3. A rotary drum screen according to claim 2, wherein the saw tooth contour increases in a heighth dimension in the direction of the drum axis with a radially outer portion extending in the direction of rotation of the casing.

4. A rotary drum screen according to claim 1, wherein the cross section of the drum casing is a polygon.

5. A rotary drum screen according to claim 4, wherein the drum casing cross section comprises an octagon and the baffle further comprises four rectangular plates having one side equal to the width of a side of the octagon and a second side equal to the cathetus length of a right angled, equal sided triangle above the octagon side.

6. A rotary drum screen according to claim 5, wherein said plurality of impact plates further comprise a plurality of rows of impact plates and wherein the distance between rows of impact plates which approximately form two screw turns is equal to twice the width dimension of said second polygon side.

7. A rotary drum screen according to claim 6, wherein said impact plates are of a length equal to one half the width of said second polygon side and have a height dimension equal to one quarter of said second polygon side.

8. A method of operating a rotary drum screen for waste material, according to claim 1, which further comprises means for rotating the drum such that the centrifugal acceleration at the drum casing is 50%–70% of acceleration due to gravity.

* * * * *